United States Patent [19]
Kim

[11] Patent Number: 6,116,152
[45] Date of Patent: Sep. 12, 2000

[54] APPARATUS FOR PRODUCING CONFECTIONERIES

[75] Inventor: Hyung Seob Kim, Seoul, Rep. of Korea

[73] Assignee: Delice Co. Ltd., Seoul, Rep. of Korea

[21] Appl. No.: 09/472,454

[22] Filed: Dec. 27, 1999

[30] Foreign Application Priority Data

May 1, 1999 [KR] Rep. of Korea ...................... 99-15819

[51] Int. Cl.$^7$ ................................ A23L 1/00; A21C 9/04; A21C 9/06; A21C 11/00; A23P 1/00
[52] U.S. Cl. ......................... 99/353; 99/386; 99/443 C; 99/450.1; 99/450.6; 99/450.7; 99/483; 425/133.1; 425/308
[58] Field of Search ............................... 99/353–355, 339, 99/340, 352, 386, 443 R, 443 C, 450, 477–479, 483, 450.1–450.8; 425/112, 363, 391, 133.1, 131.1, 307, 308; 426/138, 283, 284, 496, 502, 503, 512, 514, 517, 518

[56] References Cited

U.S. PATENT DOCUMENTS

| | | | |
|---|---|---|---|
| 3,669,007 | 6/1972 | Pulici ....................................... | 426/297 |
| 3,869,238 | 3/1975 | Racca ....................................... | 425/294 |
| 4,084,493 | 4/1978 | Quintana ................................... | 426/297 |
| 4,418,085 | 11/1983 | Becquelet ................................. | 426/297 |
| 4,515,817 | 5/1985 | Pavan ........................................ | 99/353 |
| 4,597,976 | 7/1986 | Doster et al. ............................ | 426/325 |
| 4,604,947 | 8/1986 | Pavan ........................................ | 99/353 |
| 4,778,685 | 10/1988 | Simelunas et al. ...................... | 426/297 |
| 4,876,104 | 10/1989 | McGuire et al. ........................ | 426/557 |
| 4,898,744 | 2/1990 | Liggett et al. ........................... | 426/557 |
| 4,992,285 | 2/1991 | Larsen ...................................... | 426/297 |
| 5,290,577 | 3/1994 | Tashiro .................................... | 426/383 |
| 5,330,776 | 7/1994 | Wikstroem .............................. | 198/839 |

*Primary Examiner*—Timothy Simone
*Attorney, Agent, or Firm*—Ladas & Parry

[57] ABSTRACT

The present invention relates to an apparatus for producing confectioneries, specifically to a small-sized automatic apparatus for producing confectioneries such as cakes, biscuits or breads with jelly, cream placed inside thereof. The apparatus for producing confectioneries according to the present invention comprises a driving motor; a driving gear connected to the driving motor, said driving gear having teeth at the outer periphery thereof partially; a plurality of driven shafts driven meshing with the driving gear to be intermittently driven by the driving gear; a heat plate on which frames for producing the confectioneries are placed; device for conveying the frames, the device driven by the driven shafts; an injector injecting raw ingredients from a hopper to the frame, the injector driven by the driven shaft; a reversing device placed on the heat plate, the reversing device reversing the frame upside down and driven by a sprocket contacting a chain connected to a driven shaft; and a cover-opening lever opening the cover of the frame, the lever driven by the driven shaft. The apparatus for producing confectioneries according to the present invention is relatively small and can be installed in the reach of the customer's view to induce buying of the confectionery. Furthermore, the ingredients are injected when only necessary and can be sold soon after the ingredients are injected which renders the taste of the confectioneries superior to those produced in factories.

11 Claims, 3 Drawing Sheets

APPARATUS FOR PRODUCING CONFECTIONERIES

BACKGROUND OF THE INVENTION

The present invention relates to an apparatus for producing confectioneries, specifically to a small-sized automatic apparatus for producing confectioneries such as cakes, biscuits or breads with contents such as jelly or cream placed inside thereof.

Hereinafter, the term "confectioneries" will not refer only to biscuits or the like with hard surfaces, but also to edibles such as breads or rice cakes whose surfaces are rather soft. Also, the apparatus for producing confectioneries hereinafter described will comprise machines for producing biscuits as well as breads, rice cakes and etc.

Generally, confectioneries are produced in long and large production lines located within a factory where customer's entrance is restricted. However, the confectioneries produced in these factories were subject to long conveyance distance and time since the factory was normally located far away from the customers. Though the tastes of the confectioneries are best when warm, that is when just produced, the confectioneries are inevitably subject to long conveyance time which deteriorates the tastes. In contrast, since the confectioneries produced at bakeries located near the customers are sold shortly after they are produced, they have good taste. But the confectioneries sold at bakeries are normally hand-made and expensive. Furthermore, the hand-made confectioneries are subject to different taste cause by difference in the mixture ratio or baking time of the ingredients. In order to reduce the difference in the taste, the baker has to practice for a long period of time. Also, the ovens used in the bakeries are normally closed and the customers are not allowed to view the producing process of the confectioneries.

SUMMARY OF THE INVENTION

It is an object of the present invention to provide an apparatus for producing confectioneries occupying only a small amount of space.

It is another object of the present invention to provide an apparatus for producing confectioneries which can alleviate hand-operation of the user by automatically injecting the ingredients.

It is still another object of the present invention to provide an apparatus for producing confectioneries which enables the customers to view the producing process of the confectioneries in order to induce purchasing of the confectionery.

It is still another object of the present invention to provide a reliable apparatus for producing confectioneries with fewer parts, reducing the production cost of the apparatus.

It is still another object of the present invention to provide an apparatus for producing confectioneries using a single driving motor and a plurality of driven shafts.

In order to achieve the above objects, the apparatus for producing confectioneries according to the present invention comprises; a driving motor; a driving gear connected to the driving motor, said driving gear having teeth at the outer periphery thereof partially; a plurality of driven shafts meshing with the driving gear to be intermittently driven by the driving gear; a heat plate on which frames for producing the confectioneries are placed; means for conveying the frames, said means driven by the driven shafts; an injector injecting raw ingredients from a hopper to said frame, said injector driven by the driven shaft; a reversing device placed on the heat place, said reversing device reversing the frame upside down and driven by a sprocket contacting a chain connected to the driven shaft; and a cover-opening lever opening the cover of the frame, said lever driven by the driven shaft.

Preferably, the apparatus comprises a first driven shaft installed over the driving gear, a second driven gear installed at a side of the driving gear, a third driven gear installed below the driving gear, and a fourth driven gear installed at the other side of the driving gear.

Preferably, the apparatus further comprises a nozzle portion reciprocating vertically, said nozzle portion injecting ingredients into the frames.

According to one aspect of the present invention, said means for conveying comprises a first conveying part moving the frame in longitudinal direction, and a second conveying part moving the frame in lateral direction.

Preferably, said first driven shaft drives said reversing device, and the second conveying part while lowering the nozzle portion toward the frame, and said second driven shaft drives said injector, and said third driven shaft moves the nozzle portion upward, and said fourth driven shaft drives the first conveying part.

According to another aspect of the present invention, the apparatus according to the present invention further comprises a switch which shifts connection of the injector between the hopper and the nozzle.

Preferably, said first driven shaft rotates a first crank, said first crank actuating a first arm portion to which one end of said switch is received, said first crank also actuating a slider comprising a slanted portion, wherein rolling wheel fixed to said nozzle contacts said slanted portion to move the nozzle vertically according to the movement of said slider, said slider fixed to a first moving plate.

More preferably, the apparatus according to the present invention further comprises a branching arm driving the injector according to the rotation of a first cam connected to the second driven shaft Furthermore, the third driven shaft can rotate a second crank connected to the first moving plate and said fourth driven shaft can be connected to a second cam which actuates said branching arm to drive the injector, said first conveying part can be a second moving plate to which one end of an actuating bar is connected to move the second moving plate in a sliding manner, said upper end of the pusher connected to the second moving plate.

Preferably, said second conveying part comprises a third crank connected to the first driven shaft, a third moving plate connected to the third crank, a wire connected to the third moving plate, and a pusher connected to the wire, wherein a slanted groove is formed on the third moving plate, said groove receiving a knob of the cover-opening lever so that the lever moves vertically in accordance to the movement of the third moving plate.

DETAILED DESCRIPTION OF THE INVENTION

A preferred embodiment of the present invention will be described hereafter in detail for illustrative sense only, and this embodiment should not be in any sense be interpreted as restricting the scope of the present invention.

Figure 1:
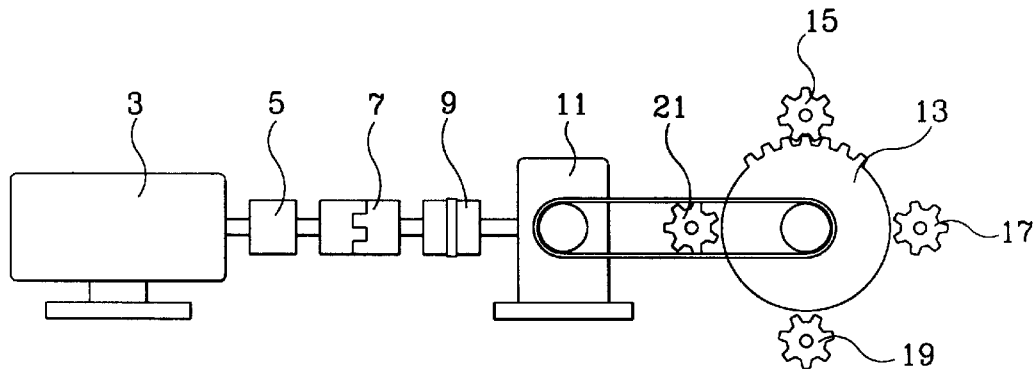
FIG. 1 is a schematic drawing showing a driving unit of the automatic confectioneries producing apparatus according to an embodiment of the present invention.

FIG. 1 is a schematic drawing of a driving unit according to the present invention. A driving motor 3 is in sequence connected to a reducing gear 5, a coupling 7, a torque limiter 9 and a worm gear 11. Output of the worm gear 11 drives a chain which drives a driving gear 13. A first driven shaft 15 is located over the driving gear 13, a second driven shaft 17 is located at the right side of the driving gear 13, a third driven shaft 19 is located below the driving gear 13, and a fourth driven shaft 21 is located at the left side of the driving gear 13. Teeth are formed partially on the outer periphery of the driving gear 13 and a full rotation of the driving gear 13 causes all of the driven shafts to rotate 360 degrees. In order to perform such an action, the number of teeth on the outer periphery of the driving gear 13 coincides with that of each driven shafts. Each driven shafts rotate in sequence to carrying out various operations in predetermined sequence as described hereinafter.

Figure 2:
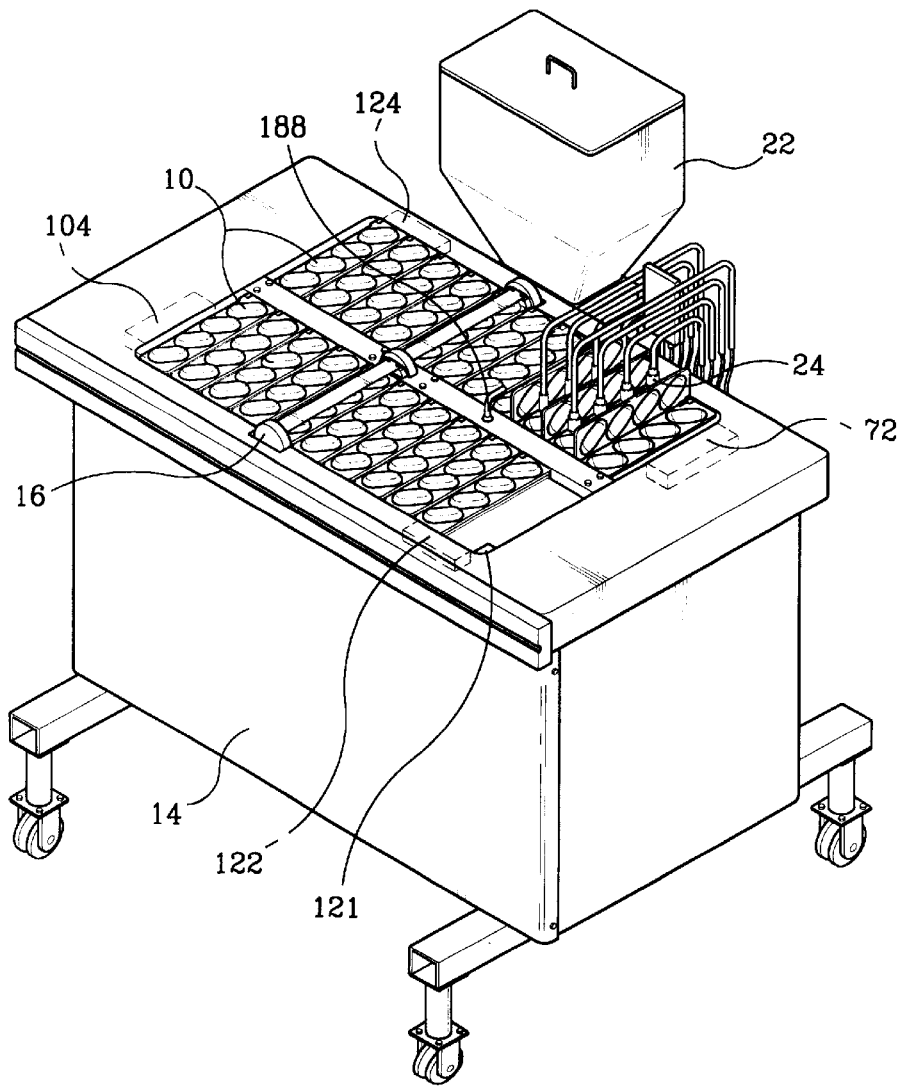
FIG. 2 is a perspective view of the embodiment according to the present invention.

FIG. 2 is a perspective view of the embodiment according to the present invention. A hopper 22 is installed at the rear side of apparatus with respect to the drawing, and an injector 25 sucks in the ingredients which are ejected through the nozzle portion 24. The ejected ingredients are injected into frames 10. An electric oven is installed below the frames 10 in order to bake the ingredients within the frames 10. The frames 10 consist of lower bodies and covers. The cover is designed to open when rotated with respect to the lower body. The inner surfaces of the frames 10 are coated in order to prevent sticking between the injected ingredients and the metal of the frames. In this embodiment, two lines of nozzles are provided. The nozzle portion located in the direction coinciding with the moving direction of the frames ejects cream ingredients surrounded by an outer portion while another line of nozzle portion located in the direction opposite to the moving direction of the frames ejaculates flour mixture forming the outer portion of the confectionery.

A row of frames 10 placed at the front side is pressed by a first pusher 104 to move the frames 10 from left to the right. On the contrary, a row of frames 10 placed at the rear side of the drawing is pressed by a second pusher 72 which moves the frames 10 in the left direction. After the frames 10 reach the right end, a third pusher 122 moves the frame 10 to the rear row whereas the frame 10 in the rear row is pushed to the front row by a fourth pusher 124 after moving to the left end of the rear row. As can be seen in the drawing, the frames 10 of the front row has its cover closed but when it reaches right end, an end 121 of a cover-opening lever rises and flips the cover open. With its cover opened, the frames are moved to the rear row by the third pusher 122. The user takes out the baked confectioneries from the frames 10 when the covers open. Thereafter, the frames move toward the nozzle portion 24 by the second pusher 72 with the cover open and then the frames are injected with raw ingredients by the injector 25 discussed below. After the injection, as the rear row of the frames move to the left by the second pusher 72, a tip bar 188 installed between the front row and the rear row of the frames 10 closes the cover of the frames 10. The frames 10 containing the ingredients therein passes the rear row and then moved to the front row by the fourth pusher 124. Thereafter, the first pusher 104 pushes the frames to the right. During the conveyance of the frames 10, the heat oven beneath the frames 10 bakes the confectioneries within the frames 10.

Figure 3:
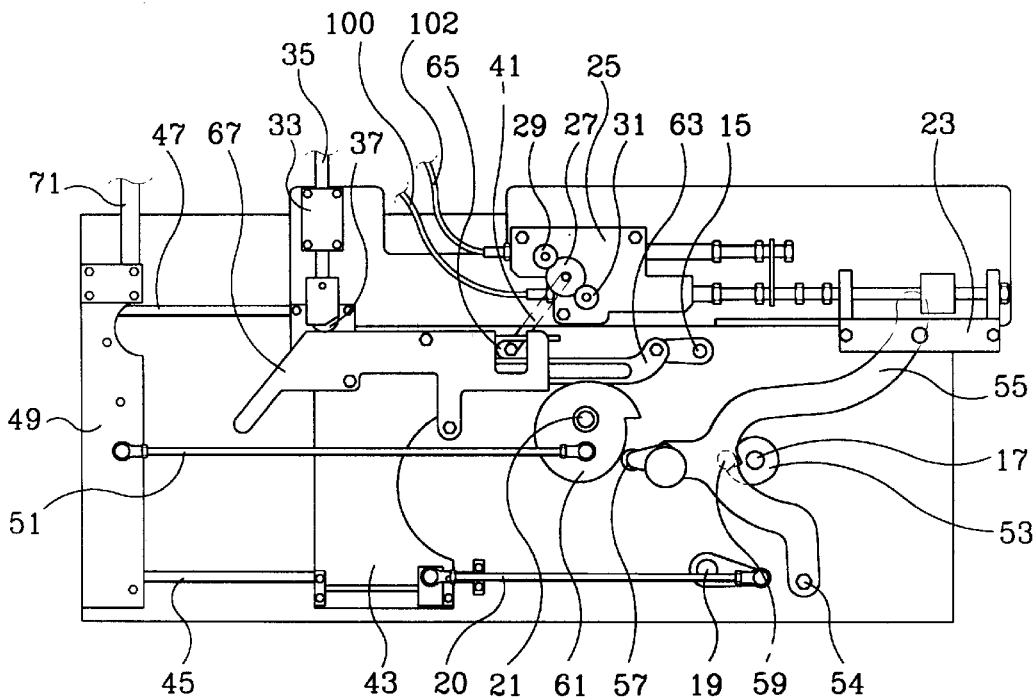
FIG. 3 shows the rear side operating mechanism of the automatic confectioneries producing machine according to the embodiment of the present invention.
Figure 4:
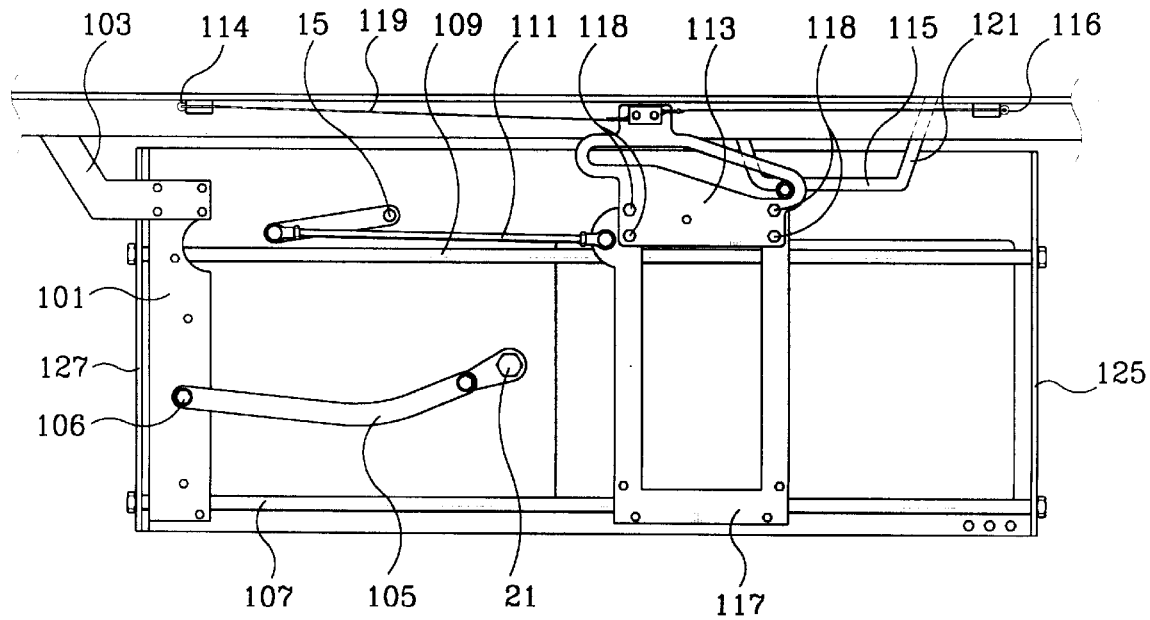
FIG. 4 shows the front side operating mechanism of the automatic confectioneries producing machine according to the embodiment of the present invention.

A front side of the apparatus according to the present embodiment is covered with a shield 14, below which parts described in FIG. 4 are installed. At the rear side of the apparatus (not shown), parts described with respect to FIG. 3 are installed. In the present embodiment, four wheel-rollers are installed at the bottom of the apparatus body to facilitate the movement of the apparatus in a narrow space. The apparatus of the embodiment is relatively small and can be placed in such places as streets or department stores where customers are accessible to the manufacturing process of the confectioneries.

FIG. 3 shows the specific mechanical structure of the present embodiment. In the drawing, a first driven shaft 15 is located at the upper portion and is connected to a slider 67 through a crank and a first arm portion 63. The driving gear 13 drives the first driven shaft 15 to move the first arm portion 63 when the first driven shaft 15 rotates, simultaneously moving the slider 67 to the right side of the drawing. When the slider 67 moves to the right, the rolling wheel 37 contacting the slider 67 moves downwards. The nozzle portion 24 is connected to the rolling wheel 37 and the intermediate shaft 35, so that when the rolling wheel 37 moves downwards, the nozzle portion 24 descends accordingly and approaches the frames 10. The first arm portion 63 rotates a switch shaft 41 in counterclockwise direction. When the switch shaft 41 rotates, the switch 27 of the injector 25 rotates switching valves 29, 31 so that ingredients in the frames 10 can be ejected to the frames 10. Here, it should be noted that the injector 25 and nozzle portion 24 are interconnected during such an operation.

After the rotation of the first driven shaft 15, the second driven shaft 17 rotates. A cam 53 is installed on the second driven shaft 17. A branching arm 55 is pivoted to the shaft 54. When the cam 53 rotates, the inner roller 59 of the branching arm 55 contacts the surface of the cam 53, pushing an end block 23 to the left. Such an operation pumps the injector 25 to supply the ingredients within the injector 25 to the nozzle portion 24 from which the ingredients are ejected into the frames 10.

The rotation of the third driven shaft 19 moves the crank which reciprocates the connecting rod 20 in horizontal direction. According to such movements, the first moving plate 43 sliding on the guide 45, 47 reciprocates horizontally in a linear manner, causing the slider 67 to move left. According to the rotation of the third driven shaft 19, the first moving plate 43 slides to the left and returns, moving a knob of the switching shaft 41 received in the split groove of the slider 67 so that the switch shaft 41 rotates in clockwise direction. When the switching shaft 41 rotates in clockwise direction, the switch 27 also rotates in clockwise direction, shifting the switching valves 29, 31 to interconnect the injector 25 and the hopper 22. Furthermore, when the slider 67 moves left along with the first moving plate 43, the rolling wheel 37 moves upward, causing the nozzle portions 24 to be lifted so that the frames 10 can be conveyed by the pushers without the interference of the nozzle portions 24.

When the fourth driven shaft 21 rotates, the eccentric cam 61 rotates the branching arm 55 in clockwise direction. Then, the end block 23 moves to the right, which causes the injector 25 to suck in the ingredients from the hopper 22.

The second moving plate 49 is supported by the guide 45, 47 in a sliding manner. The second moving plate 49 is connected to the second pusher 72 through a connecting rod 71. When the fourth driven shaft rotates, the second pusher 72 pushes the frame 10 and then returns. Wheels are installed on the portions contacting the cams 21, 53, rendering the rotation of the branching arm 55 in accordance to the rotation of the cams smooth.

FIG. 4 shows the mechanical structure installed at the front side of the apparatus. In the drawing showing the front side of the embodiment, the parts connected to the first driven shaft 15 and the fourth driven shaft 21 is shown.

The first driven shaft 15 is connected to the a third moving plate through a crank and a connecting rod 111. A guide plate 113 with slanted groove formed therein is secured to the third moving plate 117 by means of bolts 118. The third moving plate 117 slides along the guide bars 107, 109. Both ends of the guide bars 107, 109 are secured to support frames 125, 127. A knob of the cover-opening lever 115 is received within the slanted groove of the guide plate 113. When the first driven shaft 15 rotates, the guide plate 113 moves to the right side of the drawing, raising the knob along the slanted groove. Therefore, the cover-opening lever 115 moves upward, protruding from the bottom of the electric oven to open the cover of the frames 10. Thereafter, the guide plate 113 moves left, lowering the cover-opening lever 115. The upper part of the guide plate 113 is connected to a wire 119. The wire 119 extends internally to the third pusher 122 and the fourth pusher 124 through holes 114, 116 shown in the drawing. Therefore, when the guide 113 moves, the third pusher 122 and the fourth pusher 124 push the frames 10 in lateral direction.

When the first driven shaft 21 rotates, a curved connecting rod 105 moves according to the rotation. Since the connecting rod 105 is connected to the fourth moving plate 101 through a pivot 106, the fourth moving plate 101 makes linear movement when the shaft 21 rotates. Over the fourth moving plate 101, a securing plate 103 is secured thereto by bolts. The upper end of the securing plate 103 is connected to the first pusher 104 so that when the fourth driven shaft 21 makes a complete revolution, the pusher 104 pushes the frames 10 and then returns.

Figure 5:
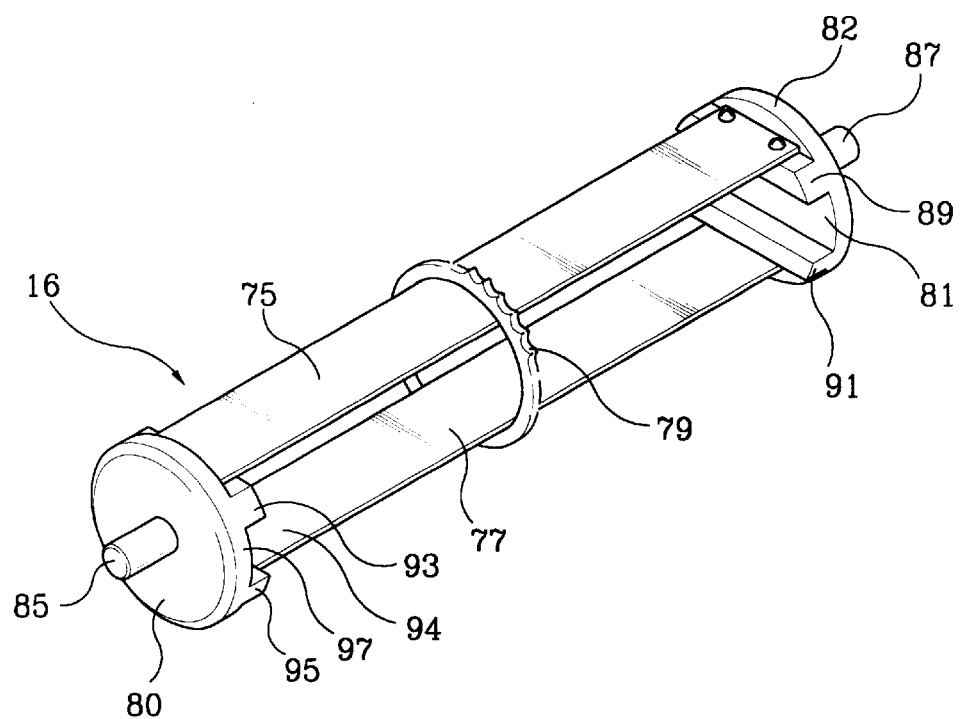
FIG. 5 shows specifically the reversing device of FIG. 2.

FIG. 5 shows specifically the reversing device 16 shown in FIG. 2. The reversing device 16 comprises a first plate 75, a second plate 77, and side members 80, 82 securing the plates from both sides. Shafts 85, 87 supporting the reversing device 16 extends outward from the side members 80, 82. At the inner side of the side members 80, 82, first protruding portions 89, 93 and second protruding portions 91, 95 are formed. Between these protruding portions, hollow portions 81, 94 are provided in which the frames 10 are received. At the middle of the first plate 75 and the second plate 77, a sprocket 79 is installed. A chain contacting the sprocket 79 also contacts another sprocket (not shown) secured to the first driven shaft 15. Since the number of teeth on the sprocket is twice that of the sprocket secured to the first driven shaft 15, a complete revolution of the first driven shaft 15 renders the reversing device 16 to rotate 180 degrees.

Figure 6:
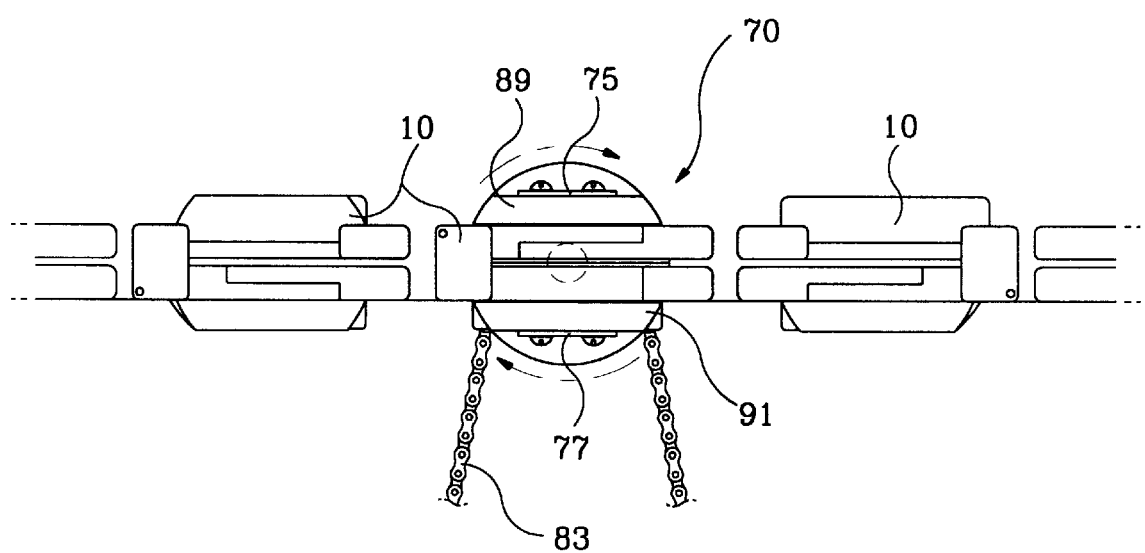
FIG. 6 shows the reversing device flipping the frames upside down.

FIG. 6 shows the reversing device 16 flipping the frames 10 upside down. When the frames 10 moves into the hollow portion 81, 94 of the reversing device 16, the first driven shaft 15 rotates along with the frames 10 received in the reversing device 16. During such an operation, the first protruding portions 89, 93 and the second protruding portions 91, 93 prevents the cover from opening.

Hereinafter the function of the switch 27 will be described in detail. The rotation of the switch 27 rotates the switching valves 29, 31 to shift the connection of the injector 25 between the hopper and the nozzle. That is, during the rotation of the second driven shaft, the injector 25 communicates with the nozzle portion 24 to inject ingredients within the injector 25 to the frames 10, and during the rotation of the fourth driven shaft, the injector 25 communicates with the hopper 22 to suck in the ingredients within the hopper 22. The switching of the switching valves 29, 31 is carried out during the rotation of the first driven shaft and the third driven shaft.

Though not shown in the drawings, a controller controlling the operation of the driving motor and the temperature of the electric oven is installed at the rear side of the apparatus. Through the operation of the controller, the temperature of the electric oven and the conveyance speed of the frames 10 can be controlled.

The hopper 22 is divided into two separate portions, one storing ingredients forming outer portion of the confectionery which consists mainly of flour and ejected through the nozzle portion located at a location opposite to the moving direction of the frames 10, while the other stores ingredients placed within the outer portion of the confectionery, which consists mainly of cream ingredients and ejected through the nozzle portion located at a location in the moving direction of the frames 10.

In the present embodiment, a 220 volts direct current motor drives each driven shafts in turn which activates related mechanism in predetermined sequence. This simplifies the structure and reduces the production cost of the apparatus by reducing the number of parts compared to an apparatus using controllers such as a Programmable Logic Controller (PLC) and a plurality of electric motors.

Various modifications will be possible without departing from the scope of the present invention. For example, instead of using a wire 199 to move the pusher, pushers connected to the second moving plate and the fourth moving plate can be used, and hydraulic motors and hydraulic actuators can be used instead of the electric motor. Furthermore, other mechanical components having similar function as the cams can also be used. Such a variation should all be recognized as an apparatus identical to the present invention.

The apparatus for producing confectioneries according to the present invention is relatively small and can be installed in the reach of the customer's view to induce buying of the confectionery. Furthermore, the raw ingredients are injected when only necessary and can be sold soon after the ingredients are injected which renders the taste of the confectioneries superior to those produced in factories. Also, the present invention uses a single motor instead of a plurality of motors and drives a plurality of parts in sequence, reducing the production cost and the number of parts involved.

What is claimed is:

1. An apparatus for producing confectioneries comprising:
   a driving motor;
   a driving gear connected to the driving motor, said driving gear having teeth at the outer periphery thereof partially;
   a plurality of driven shafts driven meshing with the driving gear to be intermittently driven by the driving gear;
   a heat plate on which frames for producing the confectioneries are placed;

means for conveying the frames, said means driven by the driven shafts;

an injector injecting raw ingredients from a hopper to said frame, said injector driven by the driven shafts;

a reversing device placed on the heat place, said reversing device reversing the frame upside down and driven by a sprocket contacting a chain connected to the driven shaft; and a cover-opening lever opening the cover of the frame, said lever driven by the driven shaft.

2. The apparatus of claim 1, wherein the apparatus comprises a first driven shaft installed over the driving gear, a second driven gear installed at a side of the driving gear, a third driven gear installed below the driving gear, and a fourth driven gear installed at another side of the driving gear.

3. The apparatus of claim 2, further comprising a nozzle portion reciprocating vertically, said nozzle portion injecting ingredients into the frames.

4. The apparatus of claim 1, wherein said means for conveying comprises a first conveying part moving the frame in longitudinal direction, and a second conveying part moving the frame in lateral direction.

5. The apparatus of claim 4, wherein said first driven shaft drives said reversing device, and the second conveying part while lowering the nozzle portion toward the frame, and said second driven shaft drives said injector, and said third driven shaft moves the nozzle portion upward, and said fourth driven shaft drives the first conveying part.

6. The apparatus of claim 5, further comprising a switch which shifts connection of the injector between the hopper and the nozzle.

7. The apparatus of claim 6, wherein said first driven shaft rotates a first crank, said first crank actuates a first arm portion to which one end of said switch is received, said first crank also actuating a slider comprising a slanted portion, wherein a rolling wheel fixed to said nozzle contacts said slanted portion to move the nozzle vertically according to the movement of said slider, wherein said slider is fixed to a first moving plate.

8. The apparatus of claim 7, further comprising a branching arm driving the injector according to the rotation of a first cam connected to the second driven shaft.

9. The apparatus of claim 8, wherein the third driven shaft rotates a second crank connected to the first moving plate.

10. The apparatus of claim 9, wherein said fourth driven shaft is connected to a second cam which actuates said branching arm to drive the injector, said first conveying part is a second moving plate to which one end of an actuating bar is connected to move the second moving plate in a sliding manner, said upper end of the pusher connected to the second moving plate.

11. The apparatus of claim 10, wherein said second conveying part comprises a third crank connected to the first driven shaft, a third moving plate connected to the third crank, a wire connected to the third moving plate, and a pusher connected to the wire, wherein slanted groove is formed on the third moving plate, said groove receiving a knob of the cover-opening lever so that the lever moves vertically in accordance to the movement of the third moving plate.

* * * * *